(12) United States Patent
Gretz

(10) Patent No.: US 6,452,813 B1
(45) Date of Patent: Sep. 17, 2002

(54) ONE-PIECE TERMINAL DEVICE FOR LOW-VOLTAGE CABLE SYSTEM

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 09/852,853

(22) Filed: May 10, 2001

(51) Int. Cl.[7] .............. H02B 1/20; H02B 1/26; H02G 3/08

(52) U.S. Cl. .............. 361/826; 361/641; 174/65 R; 174/66; 220/3.9

(58) Field of Search .............. 174/34, 19, 60, 174/57, 50–56, 58, 59, 61–67; 220/3.9, 3.92, 3.94; 361/826, 641, 724, 802, 816; D8/354, 355

(56) References Cited

U.S. PATENT DOCUMENTS

| | | | | |
|---|---|---|---|---|
| 4,328,903 A | * | 5/1982 | Baars | 220/3.7 |
| 5,354,953 A | * | 10/1994 | Nattel | 174/54 |
| 5,646,371 A | * | 7/1997 | Fabian | 174/58 |
| 5,965,844 A | * | 10/1999 | Lippa | 174/49 |

* cited by examiner

Primary Examiner—David Martin
Assistant Examiner—Michael L. Lindinger

(57) ABSTRACT

This invention is a one-piece terminal or junction device for a low-voltage linear distribution system. The terminal device is formed in one piece with a terminal plate that may be easily removed and inserted into slots in the back of the terminal device to serve as a conduit mounting point or a cable tie-off. An opening in the terminal plate is of adjustable size to accommodate different sizes of conduit. The invention may be installed in the roughing out phase of new construction. After the interior wall is installed and a system device is hooked up, screwing down the faceplate brings the terminal device into firm contact with the back of the wall for a secure, tight installation.

14 Claims, 3 Drawing Sheets

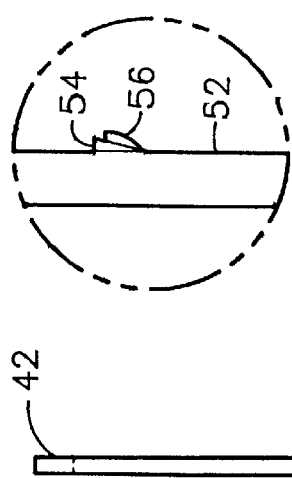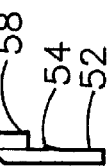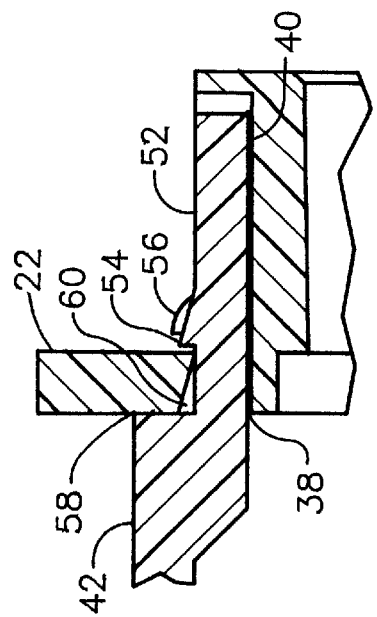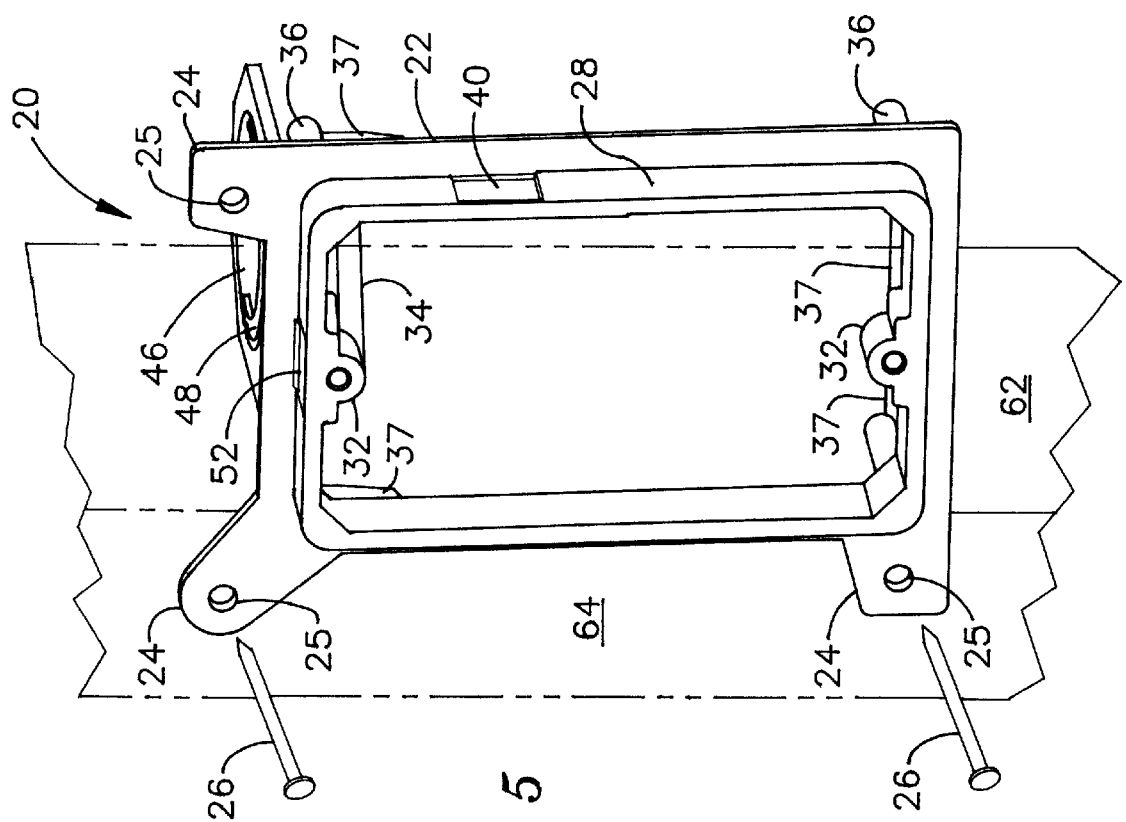

ONE-PIECE TERMINAL DEVICE FOR LOW-VOLTAGE CABLE SYSTEM

This invention is a terminal device for use in low-voltage cable systems.

Refer to the patent application TERMINAL DEVICE FOR LOW-VOLTAGE CABLE SYSTEM filed the same day as the present application with the same inventor and assignee.

There are several approaches to installing communication cable, television cable, fiber optic cable or similar low-voltage cable or wire in new construction. Many devices for providing terminals and junctions for the cable are commercially available. Most generally such devices consist of a metal or plastic rectangular box which may be attached to a stud or other structural member during the roughing-out phase of construction. Such a device has an open side that usually faces the interior of the structure once installed. Upon installation of the interior wall a hole is cut in the wall material to allow access to the open side of the box. While such an arrangement can provide a satisfactory installation it is not uncommon for such boxes to move forward relative to the wall material upon fastening of the faceplate because there exists no means to bring the box in secure contact with the rear of the wall material. While such boxes will not move relative to the structural member to which they are attached, they can and will move relative to the wall material.

SUMMARY OF THE INVENTION

The present invention is a one-piece terminal or junction device for a low-voltage linear distribution system. The device includes an open mounting plate in a plane generally parallel to and in contact with a subsequently installed wall. The mounting plate has ears for attachment to a wall stud. The mounting plate has a flange perpendicular thereto and extending forwardly which will extend through the wall and surround the wall opening. The depth of the flange will be equal to the thickness of the wall for the most secure fit. On the rear of the mounting plate are mounting slots for a terminal plate. Upon installation of a system device such as a cable outlet and application of a faceplate, as described more completely below, the surface of the mounting plate is drawn snugly against the rear of the wall when the faceplate mounting fasteners are tightened.

A terminal plate is fixed by frangible tabs in the opening formed by the flange in a plane generally parallel to the plane of the mounting plate. The terminal plate has a circular opening of adjustable size and a rigid mounting tab extending from the terminal plate. Upon fastening of the mounting plate to a wall stud the terminal plate is detached from the flange and its rigid mounting tab inserted into a mounting slot on the rear of the mounting plate. The terminal plate serves as means to tie off cable or to stub off conduit. A tie-off strap on the flange also may be used to tie off cable.

BRIEF DESCRIPTION OF THE DRAWINGS

FIG. 5 is a perspective view of the terminal device in place against a wall stud and ready to be fastened in place. The terminal plate is mounted in a slot at one end of the terminal device.

FIG. 6 is a side view of the terminal plate.

FIG. 7 is an enlarged view of a portion of FIG. 6 showing the capture tang with its nub.

FIG. 8 is a partial cross section of the terminal plate inserted in a mounting slot in the mounting plate.

DESCRIPTION OF THE PREFERRED EMBODIMENT

Figure 1:
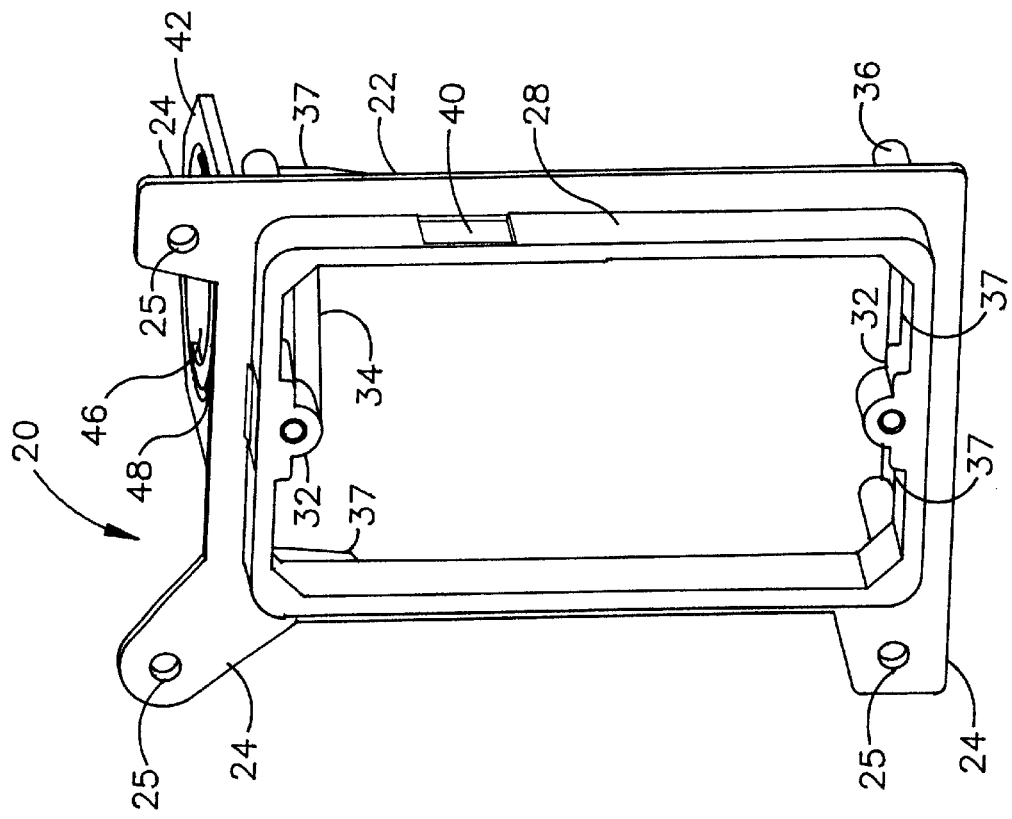
FIG. 1 is a perspective view of the cable terminal device as manufactured.

FIG. 1 is a perspective view of the terminal or junction device of the present invention.

FIG. 5 is an exploded view of the cable terminal device of the present invention and its relationship with a wall stud when it is ready to be installed. Such a device is used in the roughing-out phase of construction. It is installed when structural members are in place but before the interior walls are installed. While the device of the present invention may be referred to herein as a terminal device it is to be understood that it may serve as either a terminal or a junction device.

There is shown a terminal device 20 consisting of a generally rectangular mounting plate 22 having mounting ears 24 in the same plane as the mounting plate 22. Any number of mounting ears 24 may be provided. Three are shown so that the device 20 may be mounted with its long axis either horizontal or vertical. FIG. 5 shows it with the long axis vertical. The mounting ears 24 have openings 25 to accommodate fasteners such as nails or screws 26; see FIG. 5.

Extending forwardly from the mounting plate 22 at essentially a right angle thereto is mounting flange 28. The flange 28 is of a depth essentially equal to the thickness of the wall material with which the device will be used.

Bosses 32 on the sides of the flange 28 have openings for attachment of a system device such as a cable outlet with a faceplate, not shown. As shown in the figures these bosses 32 are located on the short sides of the flange 32. A tie-off strap 34 is shown extending from one boss 32 to the flange at one side of the device. This strap 34 provides a means for tying off the ends of cable which is being run to the terminal device 20. Any number of tie-off straps 34 may be provided and they may be located at other places such as across the corners of the flange 28.

Figure 3:
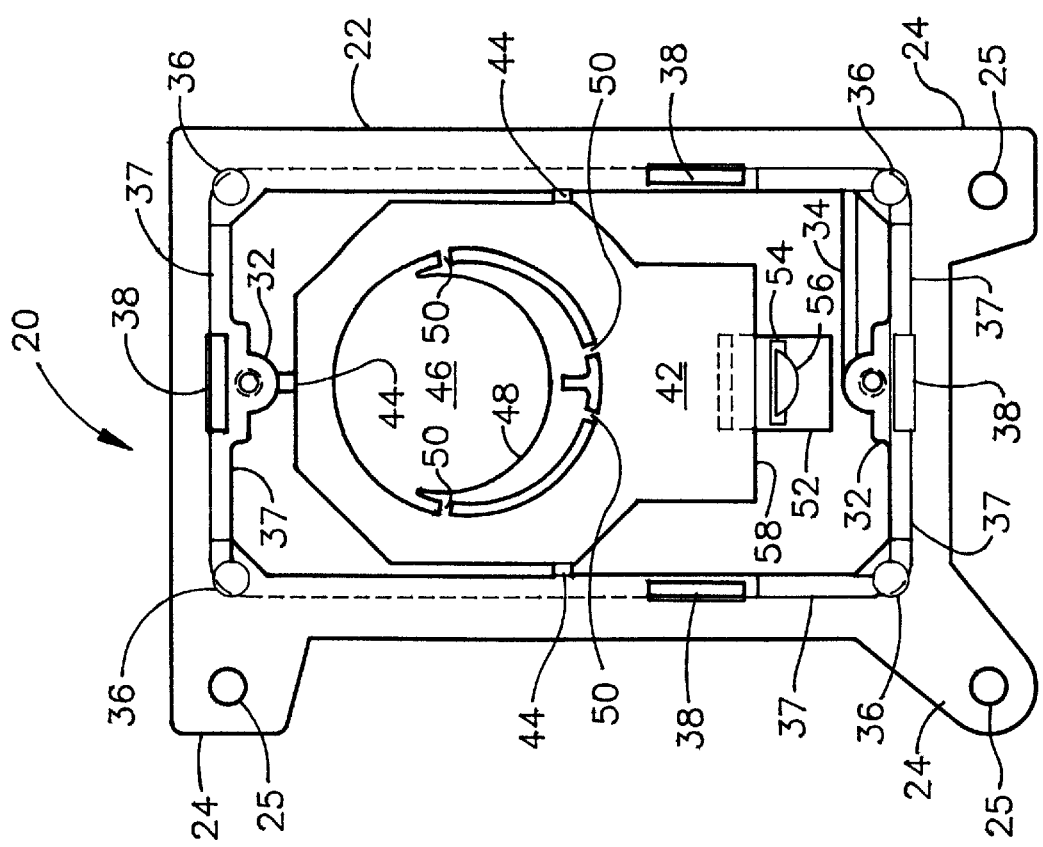
FIG. 3 is a plan view of the rear of the terminal device turned upside down from that shown in FIGS. 1–2 with the terminal plate in place as manufactured.

On the rear face of the mounting plate 22, as especially seen in FIG. 3, are stop posts 36 extending from the four corners. These posts 36 serve as stops to locate the mounting plate against the stud to which it is being mounted as more fully described below. Although it is not necessary to use posts at each corner, this arrangement is most convenient since it allows the mounting plate 22 to be oriented either horizontally or vertically against a stud. Generally triangular gussets 37 provide bracing for the stop posts 36 and help to rigidify the mounting plate 22 against the forces of insertion of the terminal plate 42 as will be discussed below.

Figure 2:
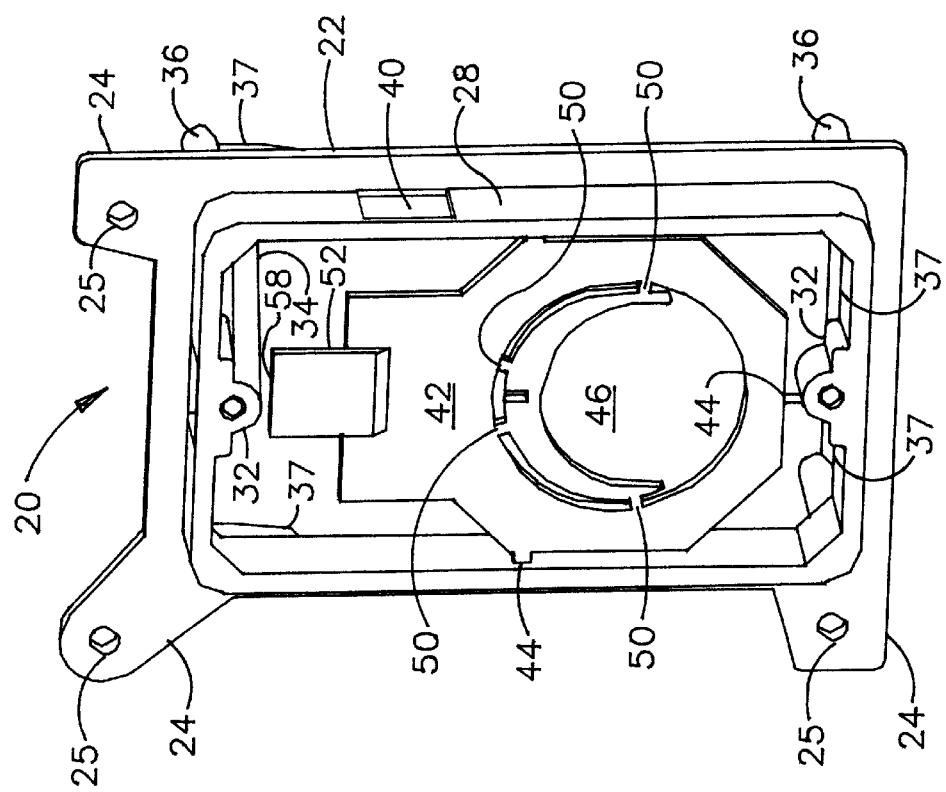
FIG. 2 is a perspective view of the device with the terminal plate broken out and inserted in one of the mounting slots in the mounting plate.
Figure 4:
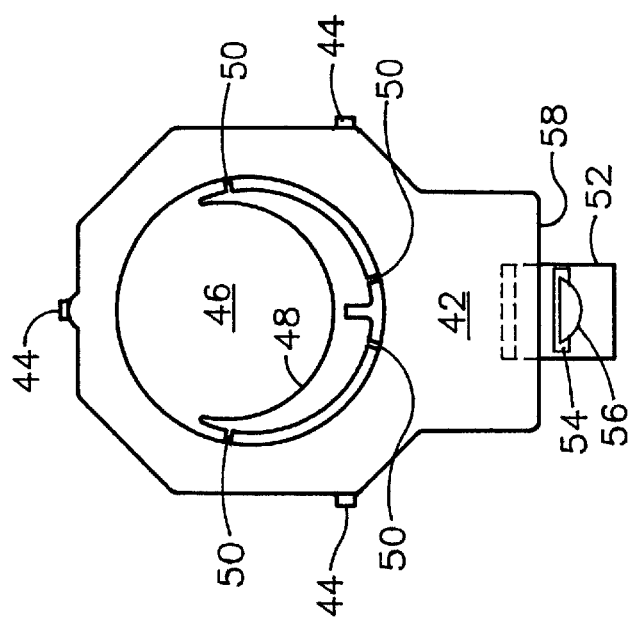
FIG. 4 is a plan view of the front of the terminal plate by itself.

Referring to FIG. 3 mounting slots 38 for terminal plate 42 are formed in the rear of the mounting plate 22. A channel 40 is formed on the flange 28 to complete the slot 38 as shown particularly in FIGS. 1, 2 and 5. Although any number of the mounting slots 38 may be provided, four are shown in this preferred embodiment, one on each side of the mounting plate. This makes the device significantly more versatile than those of the prior art.

Terminal plate 42 is removably mounted in the rectangular opening formed by the flange 28. If the terminal device 20 is of molded plastic the terminal plate 42 may be formed in the same molding connected to the flange 28 by frangible tabs 44 of which three are shown; a greater or lesser number may be used where desirable. Circular opening 46 is formed in the terminal plate 42 with an eccentric section 48 connected by frangible tabs 50 to the terminal plate 42, the purpose of which will be discussed below. A mounting tab 52 extends from one side of the terminal plate 42. The tab 52 is formed in a plane offset from the plane of the terminal plate 42 but parallel thereto as shown particularly in FIG. 6. A capture tang 54 extends across tab 52 essentially its entire width. The capture tang 54 has formed on it a semicircular nub 56 the purpose of which will be discussed below.

Although one terminal plate 42 is shown in a single piece with terminal device 20 in FIGS. 1 and 3, it may be desirable to have two or more terminal plates formed so, the number limited only by the thickness of the terminal plate 42 and the depth of flange 28.

FIG. 8 is an enlarged partial cross section of the terminal plate 42 in operative position with the rigid mounting tab 52 inserted into the mounting slot 38 in the mounting plate 22. The spacing of the capture tang 54 from the end 58 of the terminal plate 42 is slightly larger than the thickness of the mounting plate 22. One side 60 of mounting slot 38 is angled to facilitate insertion of rigid mounting tab 52 into the slot 38 to the point where the end 58 of terminal plate 42 stops against the rearward face of the mounting plate 22 and the capture tang 54 snaps into place against the forward face to hold the terminal plate 42 in operative position. The semicircular nub 56 also eases insertion of the rigid mounting tab 52 into slot 38 by providing essentially line contact between tab 52 and mounting plate 22. Yet when tab 52 is inserted fully, the entire width of the capture tang 54 holds tab 52 in place against removal forces. Gussets 37 adjacent to slots 38 serve to rigidify the sides and ends of the mounting plate 22 against the forces of insertion of rigid mounting tab 52.

The terminal device of the present invention would be used as follows: In new construction, in the roughing-out phase before wall material is installed, the terminal device 20 would be installed as shown generally in FIG. 5. For vertical installation the terminal device is held against a wall stud 60 with stop posts 36 against the inside face 62 of the stud and the two mounting ears 24 on the long side of the device flat against the outside face 64 of the stud. If installation is desired on the other side of the stud, the device 20 is merely turned in its own plane 180°. Fasteners such as the nails 26 are driven through the mounting ears 24 into the outside face 64 of wall stud 60 to hold the terminal device 20 in place.

For horizontal installation the stop posts 36 on the short side of the terminal device 20 would be held against the inside face 62 of the stud and fasteners 26 driven through the mounting ears 24 on the short side into the outside face 64 of the stud 60.

Now or at any other time before wall material is applied terminal plate 42 may be removed from the flange 28 merely by bending the plate 42 until the frangible tabs 44 break. If conduit is to be stubbed off at this location the eccentric section 48 may be removed by bending until the frangible tabs 50 break. Or, depending on the size of the conduit, eccentric section 48 may be left in place. The rigid mounting tab 52 of the terminal plate 42 may then be inserted as described above into any one of the mounting slots 38 desired. If no conduit is to be used at this terminal the terminal plate 42 may be discarded.

If conduit is to be stubbed off on terminal plate 42 this may be done at this time, or at any other time before application of wall material 30. The cable destined for this device may be tied to the terminal plate 42 through the opening 46, or to the tie-off strap 34 as the installer chooses.

Wall material may then be applied to the wall, leaving an opening to surround flange 28 of the terminal device 20. At this time a system device such as a cable outlet [not shown] may be connected to the cable which has been tied off at the terminal device. The system device may then be mounted to the terminal device 20, for example by screws through the system device into bosses 32. A faceplate may then be installed over the system device by usual means such as screws through the faceplate into the system device. The faceplate screws are then tightened such that the faceplate pushes the wall material into tight contact with the face of mounting plate 22 which in turn is rigidly attached to wall stud 60, thus making a tight, secure installation.

The terminal device shown and claimed here may be used for roughing out terminals in any number of different low-voltage linear distribution systems, such as television coaxial cable, sound systems, intercommunication systems and fiber optic cable systems. The device is relatively cheap to manufacture, especially when molded of plastic. All the components necessary for the rough installation of a terminal are in one piece. Packing and warehousing are simplified. Installation of the device is simple and quick.

While the terminal device 20 is molded of plastic in the preferred embodiment, it would be possible to make it by other means, such as stamping it from steel plate, at least in the form shown in FIG. 1 Also two or more such terminal devices could be ganged in one piece according to the principles of this invention.

While there has been illustrated and described a particular embodiment of the present invention, it will be appreciated that numerous changes and modifications will occur to those skilled in the art. It is intended in the appended claims to cover all such changes and modifications which fall within the true spirit and scope of the present invention.

I claim:

1. A terminal or junction device for a low-voltage cable distribution system comprising:

A) a rectangular mounting plate having a rectangular opening therein and having mounting ears extending from the mounting plate ate three corners thereof, the mounting ears having fastener openings therein;

B) a flange extending forwardly from the mounting plate at the periphery of the rectangular opening;

C) a fastener boss located at the center of each of the short ends of the flange and having fastener openings therein;

D) a stop post at each corner extending rearwardly from the mounting plate;

E) at least one triangular gusset formed between each stop post and the mounting plate;

F) mounting slots in the rear face of the mounting plate on each of the four sides thereof;

G) a terminal plate removably attached to the flange by frangible tabs, the terminal plate being parallel to the mounting plate or closely spaced therefrom;

H) the terminal plate having a circular opening of adjustable size and having a rigid mounting tab with a capture tang extending across the width thereof, the capture tang having a semicircular nub formed on it in the middle thereof.

2. The terminal or junction device of claim 1 in which the terminal plate may be removed from the flange by breaking the frangible tabs and the rigid mounting tab of the terminal plate may be inserted into one of the mounting slots in the mounting plate and held there in operative position by the capture tang.

3. A terminal or junction device for a low-voltage cable distribution system comprising:

A) a mounting plate having a rectangular opening therein and including four corners and a mounting ear extending from at least one corner of said mounting plate;

B) a flange extending forwardly from the mounting plate about the periphery of the rectangular opening;

C) a boss on at least one end of the flange for receiving fasteners;

D) a stop post extending rearwardly from each of at least two corners of the mounting plate; and E) at least one terminal plate removably mounted in the rectangular opening by at least one frangible tab between the terminal plate and the flange and parallel to the mounting plate or closely spaced therefrom.

4. The on-piece terminal device for low-voltage cable systems of claim 3 in which the terminal plate includes a circular opening and has a rigid mounting tab on the periphery of the terminal plate.

5. The one-piece terminal device for low-voltage cable systems of claim 4 including a mounting slot for the terminal plate in at least one side of the rectangular mounting plate.

6. The one-piece terminal device for low-voltage cable systems of claim 5 in which the terminal plate may be removed from the mounting plate by breaking the frangible tab.

7. The one-piece terminal device for low-voltage cable systems of claim 6 in which the terminal plate may be attached to the mounting plate by inserting the rigid mounting tab into the mounting slot in the mounting plate.

8. The one-piece terminal device for low-voltage cable systems of claim 7 in which the size of the circular opening in the terminal plate may be changed by removal of a portion of the terminal plate eccentric to the circular opening.

9. The one-piece terminal device for low-voltage cable systems of claim 8 in which the rigid mounting tab includes a capture tang extending from the surface of the mounting tab across the width thereof, the capture tang having a semicircular nub in the middle thereof.

10. The one-piece terminal device for low-voltage cable systems of claim 9 in which the terminal plate may be fastened to the mounting plate in operative position by inserting the rigid mounting tab into a mounting slot until the edge of the terminal plate stops against one face of the mounting plate and the capture tang snaps into place against the other face of the mounting plate.

11. The one-piece terminal device for low-voltage cable systems of claim 3 in which the mounting ears are extensions of the mounting plate and have openings in therein for fasteners.

12. The one-piece terminal device for low-voltage cable systems of claim 11 in which the mounting ears are extensions of the mounting plate and have openings therein for fasteners.

13. The one-piece terminal device for low-voltage cable systems of claim 3 in which a stop post is located at each corner of the mounting plate.

14. The one-piece terminal device for low-voltage cable systems of claim 3 in which a stop post is located at each corner of the mounting plate.

* * * * *